US010585764B2

(12) United States Patent
Boden et al.

(10) Patent No.: US 10,585,764 B2
(45) Date of Patent: Mar. 10, 2020

(54) DATA STORAGE SYSTEM COMPRISING PRIMARY AND SECONDARY STORAGE SYSTEMS

(71) Applicant: International Business Machines Corporation, Armonk, NY (US)

(72) Inventors: Ian Boden, Southampton (GB); John P. Agombar, Winchester (GB); Gordon Hutchison, Eastleigh (GB); Lee J. Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 15/722,121

(22) Filed: Oct. 2, 2017

(65) Prior Publication Data
US 2019/0102264 A1   Apr. 4, 2019

(51) Int. Cl.
*G06F 11/16*  (2006.01)
*G06F 11/20*  (2006.01)

(52) U.S. Cl.
CPC ...... *G06F 11/1662* (2013.01); *G06F 11/2094* (2013.01)

(58) Field of Classification Search
CPC ............. G06F 11/1662; G06F 11/2025; G06F 11/2064; G06F 11/2071; G06F 11/2082; G06F 11/2092
USPC ....... 711/114, 162; 714/6.22, 6.23, 6.3, 6.32
See application file for complete search history.

(56) References Cited

U.S. PATENT DOCUMENTS

| | | | | |
|---|---|---|---|---|
| 5,615,329 | A  * | 3/1997  | Kern | G06F 11/2064 714/6.12 |
| 5,720,029 | A  * | 2/1998  | Kern | G06F 11/2064 714/20 |
| 7,143,308 | B2 | 11/2006 | Tseng et al. | |
| 7,877,626 | B2 | 1/2011  | Piszczek et al. | |
| 2005/0114741 | A1* | 5/2005 | Chen | G06F 11/0727 714/6.23 |
| 2009/0313428 | A1 | 12/2009 | De Jong | |
| 2016/0026548 | A1* | 1/2016 | Fujita | G06F 11/2082 714/6.23 |
| 2017/0017550 | A1 | 1/2017 | Matsui | |

OTHER PUBLICATIONS

Breuer et al., "Intelligent Networked Software RAID," http://www.academia.edu/2492237/Intelligent_Networked_Software_RAID, 11 pgs., Jan. 31, 2017.

* cited by examiner

*Primary Examiner* — Gary J Portka
(74) *Attorney, Agent, or Firm* — Timothy J. Singleton

(57) ABSTRACT

Data is stored on a primary storage system and a copy of the data is stored on a secondary storage system. A determination is made that a connection between the systems is currently unavailable. Location data is maintained that identifies where changes have been made to the primary storage system while the connection is unavailable. Another determination is made that data has been lost at the secondary storage system. Recovery data required to repair the lost data is identified. Another determination is made that the connection to the secondary storage system is now available. The location data is updated with the locations of the recovery data. The secondary storage system is updated with data from the primary storage system as defined by the location data.

13 Claims, 6 Drawing Sheets

DATA STORAGE SYSTEM COMPRISING PRIMARY AND SECONDARY STORAGE SYSTEMS

BACKGROUND

The present disclosure relates to a data storage system comprising a primary storage system, a secondary storage system, and to a method of operating the data storage system.

SUMMARY

According to a first aspect of the present disclosure, there is provided a method of operating a data storage system comprising a primary storage system and a secondary storage system connected to the primary storage system. As part of the method, a set of data is stored on the primary storage system and a copy of the set of data is stored on the secondary storage system. A determination is made that a connection from the primary storage system to the secondary storage system is currently unavailable. Location data is maintained that identifies where changes have been made to the primary storage system while the connection to the secondary storage system is unavailable. Another determination is made that data has been lost at the secondary storage system. Recovery data required to repair the data that has been lost at the secondary storage system is identified. Another determination is made that the connection to the secondary storage system is now available. The location data is updated with the locations of the recovery data required to repair the data that has been lost at the secondary storage system. The secondary storage system is updated with data from the primary storage system as defined by the location data.

According to a second aspect of the present disclosure, there is provided a data storage system comprising a primary storage system and a secondary storage system connected to the primary storage system. The data storage system is arranged to perform a set of steps. These steps include a set of data being stored on the primary storage system and a copy of the set of data is stored on the secondary storage system. A determination is made that a connection from the primary storage system to the secondary storage system is currently unavailable. Location data is maintained that identifies where changes have been made to the primary storage system while the connection to the secondary storage system is unavailable. Another determination is made that data has been lost at the secondary storage system. Recovery data required to repair the data that has been lost at the secondary storage system is identified. Another determination is made that the connection to the secondary storage system is now available. The location data is updated with the locations of the recovery data required to repair the data that has been lost at the secondary storage system. The secondary storage system is updated with data from the primary storage system as defined by the location data.

According to a third aspect of the present disclosure, there is provided a computer program product for controlling a data storage system comprising a primary storage system and a secondary storage system connected to the primary storage system, the computer program product comprising a computer readable storage medium having program instructions embodied therewith, the program instructions executable by a processor to cause the processor to perform a method. As part of the method, a set of data is stored on the primary storage system and a copy of the set of data is stored on the secondary storage system. A determination is made that a connection between the primary storage system and the secondary storage system is currently unavailable. Responsive to the unavailability determination, location data is maintained to identify where changes are being made to the set of data stored on the primary storage system while the connection is unavailable. Another determination is made that a portion of the copy of the set of data has been lost at the secondary storage system. Recovery data required to repair the portion that has been lost at the secondary storage system is identified. A determination is made that the connection is reestablished. Responsive to the reestablishment determination, the location data is updated with the locations of the recovery data required to repair the portion that has been lost at the secondary storage system. The secondary storage system is updated with data from the primary storage system as defined by the updated location data.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
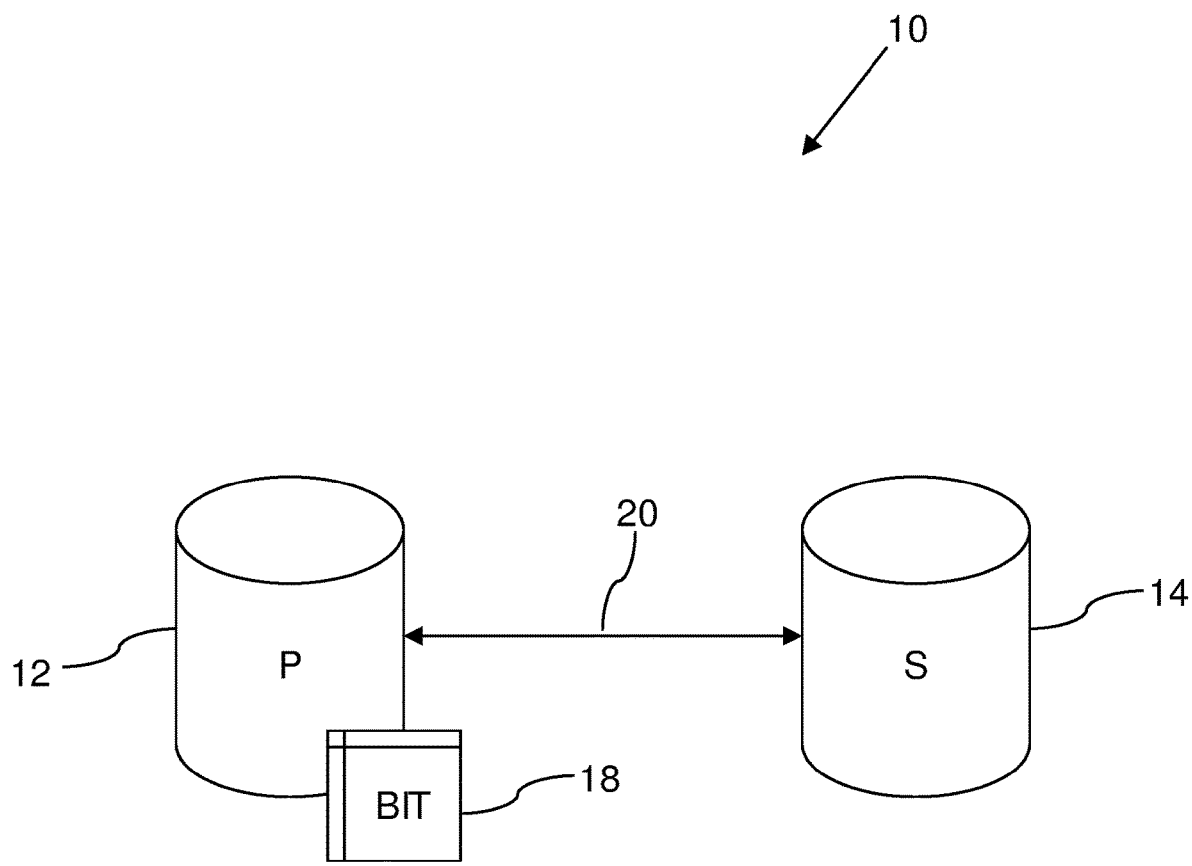
FIG. 1 illustrates a schematic diagram of a data storage system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

FIG. 1 shows schematically a data storage system 10, which comprises a primary storage system 12 and a secondary storage system 14 connected to the primary storage system 12. The secondary storage system 14 is used to keep a remote copy of the data stored by the primary storage system 12 as a backup of the main version. Each storage system 12 and 14 comprises a set of drives that store their data. The primary storage system 12 stores the data using RAID arrays. RAID arrays are designed to reduce the chance of data lose caused by drive failures. However regardless of the RAID level used, with enough drive failures a RAID array will lose data.

In the event of the primary copy 12 being lost, a user can restore lost data from their remote copy 14. Drive failures can also occur in the drives that store the backup data. In the event of the remote copy being lost then a new copy needs to be created. While the copying is taking place, the primary version may be the only version of the data. Links between remote sites can be expensive and slow, so data transfer rates are typically low, which means this can take a long time. The restoration of data from the secondary storage system 14 to the primary storage system 12 (or vice versa) can be a significant drain on resources of bandwidth and processing time, since many data storage systems are storing many terabytes (TB) of data.

During normal operation of the data storage system 10, there are multiple different ways for the primary storage system 12 to know what to send to the secondary storage system 14. For example, the data storage system 10 can use a bitmap 18 showing the differences between the primary storage system 12 and secondary storage system 14. Each bit of the bitmap 18 corresponds to a data location (however the size is defined) within the primary storage system 12. Even in the case of a synchronous remote copy, which has the same data on both sites during normal operation, once a connection 20 between the two systems 12 and 14 is dropped, the bitmap 18 may used to indicate writes that have happened since the link 20 was lost. This allows, when the link 20 to comes back online, for a background process to re-sync the data between the two systems 12 and 14. However, in many instances, this process assumes that when the link 20 comes back, the remote copy 14 has not lost data that was previously sent along the connection 20.

Figure 2:
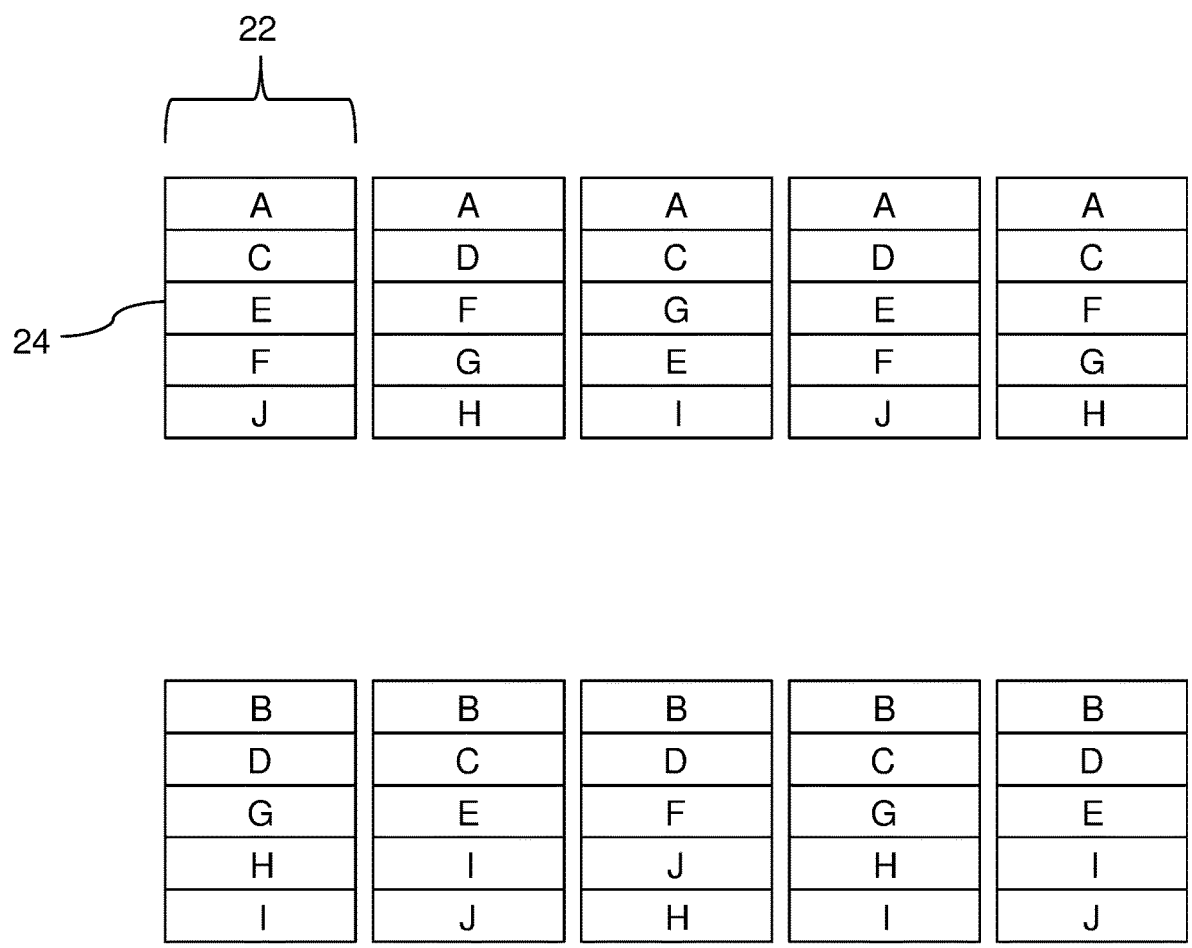
FIG. 2 illustrates a schematic diagram of a set of drives of a storage system, in accordance with embodiments of the present disclosure.

FIG. 2 illustrates, as an example, a set of ten drives 22 within the primary storage system 12 that is configured as a RAID array (equally, the arrangement shown in FIG. 2 could be applied at the secondary storage system 14). Each drive 22 includes stripes 24. A distributed RAID array may use a wide striping width in order to distribute stripes 24 across a larger set of drives 22 such that a stripe 24 does not use all drives 22. The larger the set of drives 22 compared to the stripe width, the smaller the percentage of data that is lost when one or more drives 22 fail. Here, each block of data (labelled "A", "B", etc.) is spread across five individual drives 22 of the total of ten drives 22. In this example data redundancy is provided by the fact that for each of the set of five stripes 24 of each block of data, three drives 22 will be storing actual data and two of the drives 22 will be storing parity data that is generated from the other three drives 22. This arrangement shown in FIG. 2 can stand up to two drive failures without any loss of data, since failed drives can be replaced and the data on the failed drives can be reconstructed from the parity information (or the parity information reconstructed from the other data as appropriate). However, if three drives failed in the arrangement shown in FIG. 2, then actual data would be lost and data would need to be restored from the secondary storage system 14.

As lost data at a storage system is usually only a small fraction of the overall user volume data being stored thereon, recreating backup data after data loss at the secondary storage system 14 (or the primary storage system 12), at the whole volume level is very wasteful and for large arrays, where a failure may affect only a small proportion of many volumes, impractical. In some situations, the system 10 could be configured to include an extra backup of the secondary storage system 14, but this is a needless duplication that users are unlikely to choose given the cost involved. Another consideration is that the system 10 may need to account for the fact that while the secondary storage system 14 is attempting to cope with a hardware failure, normal business often continues to carry on producing new updates on the primary storage system 12, which may need to be dealt with.

Although a failing component is a contiguous piece of storage at the physical address layer, logical storage block addresses are mapped across physical storage devices and a given sub-LUN data grouping, such as stride (e.g., a set of stripes 24 relating to the same logical volume), generally has to have multiple failing stripes 24 before it becomes unrecoverable using RAID schemes. This means that any unrecoverable storage is likely to be a scattering of address ranges that is an almost meaningless set of numbers to the user, making any manual, sub-LUN recovery nearly impossible to perform rapidly or accurately, even if the system 10 exported enough of the geometry details to perform this mapping.

In some embodiments, the data storage system 10 is operated to construct a description of data that has been lost due to drive failure on the secondary storage system 14 and to transmit this information to the primary storage system 12, to be combined with the ongoing bitmap 18 of writes on the primary storage system 12 that have not yet been sent to the secondary storage system 14, in order to provide a single result, such as the bitmap 18 (with the union of bits set), to drive IO to the secondary storage system 14 in order to recreate the lost data on the secondary storage system.

In a particular embodiment of the data storage system 10, the bitmap 18 constructed at the primary storage system 12 contains a 1 for each grain of data on the secondary storage system 14 that was affected by a drive failure and which cannot be recovered using standard RAID techniques. This could occur, for example, if there was not enough redundancy due to multiple drive failures. For another example, this could occur if, during standard RAID recovery, a read error caused by a bad sector on a disk being read for recovery purposes creates a "kill-sector" of lost data on the secondary storage system 14.

Embodiments of the present disclosure simplify the implementation of a data recovery process by sending the extra required metadata to the primary storage system 12 from the secondary storage system 14 in the format that is used for flagging writes that need to be copied to the secondary storage system 14 in the opposite direction. The bitmap 18, which represents grains in the RAID array, handles the distribution of updates from the host and the grain size used allows for one data structure to cover a whole volume address range in a reasonable total size. Such an implementation may have the disadvantage of rounding-up to the selected grain size (which is 256 K in some embodiments, particularly where the size of a typical RAID is 16*16 K strips); however, this allows for full stride writes without wasting bandwidth if most of the IO is sequential or covers large areas.

Although the data storage system 10 can numerically sort the data sent by address, this additional data requested for data recovery is generally not in contiguous large areas. Usually, the minimum amount of data that would need to be sent would be a single stripe 24 per stride that has gone over the recovery threshold of drives lost in order to get the stride back into a state that is recoverable using RAID. However to recover from double failures in, for example, RAID 6 requires the whole remaining stride of data and parity to be read, so minimizing the cross site data and sending a single stripe 24 to get back to that state is not necessarily optimal. Also, even if recovery is possible using a single P parity and the reading of a single row of the stride, the fact that the system has lost a whole column of the stride generally means all rows would have to be read as every row with a P parity contains one lost stripe from the failed column, as the system is unlikely to skew stripes to drive mappings within a single RAID 6 stride matrix. Therefore, the data storage system 10 may be configured to resend more than the minimum number of stripes 24, either augmented by RAID recovery or not. It may even resend enough to support full stride writes and no RAID recovery at the remote site. In some situations, the sending of a parity stripe would require addressing at the physical layer and would not be necessary because the parity can be recovered by sending enough data stripes 24 to the secondary storage system 14 so that it can then recalculate parity.

In the context of the data storage, a stretch indicates the series of stripes 24 on a drive 22 that have identical stride geometries, before the geometry is rotated or perturbed. From this series the data storage system 10 can create a simple formula for the logical addresses (such as a single 16 K stripe of four 4 K blocks) that have to be sent over for that stretch. Specifically, the system 10 can take a starting address X, the amount this address increments for each whole row of the distributed array (this may be an array constant), the failed stripe size (this also may be an array constant), and the number of rows of stripes for which this stretch's geometry lasts (this may be a system or array constant). The array constants need only be transmitted once. Also, the sequence of stretch geometries may be a repeating sequence taken from a standard dictionary of bitmaps used for every array of the same member size with each sequence repeat commencing at an appropriately incremented storage size offset that is also a function of the array member size.

If both the primary and secondary storage systems 12 and 14 are using the same codebase, the primary storage system 12 will have knowledge of the exact geometry used for any remote array, given its member size and current failures map. In such a case, only the member ID of the drive 24 than has failed and broken the redundancy limits needs to be transmitted back to the primary storage system 12. The data storage system 10 has a range of means (formats) to send the additional data request for data to be recovered. As the common knowledge between the two data storage systems 12 and 14 increases, the efficiency of data traffic increases but the ability to work across versions and products decreases. The list of possible means includes, but is not limited to, a set of data addresses (defining data locations) and range pairs, a bitmap of grains, a formula that can be used to programmatically generate either of the previous options, the variable data that can be plugged into an assumed formula as mentioned and each of the previous options but for one or two lost stripes used as mini-grains (16 K) rather than a whole grain (256 K) much of which will not need to be sent. In this list of options there is increased data efficiency but less portability as the different options run down the list.

For explanatory purposes, assume that the data storage system 10 is using a scheme that is most simply spliced into a bitmap of grains used by a remote copy front end, e.g., a bitmap of 256 K grains. The primary storage system 12 has a bitmap 18 detailing which writes need to be sent to the secondary storage system 14. Each bit in the bitmap 18 represents a grain which is a span of LBAs (logical addresses). The grain size is implementation specific, 256 K in used here for the remote copy, implying 64×4 K of LBAs. If a bit is set, then the whole grain is sent by the primary storage system 12 to the secondary storage system 14. Although a particular embodiment uses a bitmap 18 to represent a list of grains with a grain size the same as that used in both the primary storage system 12 and the secondary storage system 14, tracking changed areas of user data at the primary storage system 12 could be done in many different ways.

Continuing the example, the primary storage system 12 contains LUN A (LUN or logical unit is a term for a user volume of stored data) and the secondary storage system 14 contains LUN A' which is a backup copy of LUN A. The primary storage system 12 also contains the bitmap 18 which has a bit set for each grain that has been written to LUN A but not yet copied over to the remote site and written to LUN A'. At some future time, the distributed RAID array that forms the secondary storage system 14 which contains LUN A' suffers multiple concurrent drive failures resulting in data loss with multiple unreadable stripes that cannot be reconstructed using parity operations. At this point, LUN A' goes offline to normal operations. As the back-end represented by the secondary storage system 14 is offline, the relationship between LUN A and LUN A' is stopped and LUN A' goes into repair mode. At this point LUN A' cannot be written to by user applications, although optionally the system 10 could allow reading with the return of bad-sector type errors for the small percentage of unreadable stripes. The repair mode's prevention of reads and writes could be applied to either the whole volume to maintain cross volume consistency or on a block by block basis for reads as only a small subset of strides are affected. In this mode, new writes going to LUN A are no longer echoed across the remote copy relationship and instead these operations build up, with each grain that is written to being recorded in the bitmap 18 on first write.

At the secondary storage system 14, a recovery process is started. RAID recovery is applied to all strides that have not lost more than the number of stripes that RAID can protect from. Any stride that that cannot be rebuilt using RAID parity has its grain marked in a second bitmap. At this point, either the bits of the second bitmap could be sent in a constant flow of chunks of any size to the primary storage system 14 as they are determined, or once RAID recovery has completed, the whole second bitmap could be sent together for sub-parts of the array (to cover any bad sectors discovered during raid recovery reading). Ultimately the whole second bitmap is sent to the primary site. As portions of second bitmap arrive they are logically joined (e.g., ORed) into the first bitmap 18. The primary storage system 14 submits all grains stored (e.g., represented by a 1) in the first bitmap 18 (which at some point will contain each of the grains that were lost on the secondary storage system 14 due to drive failure) to LUN A' across the remote copy link, removing the grains from the bitmap as it goes. Once the bitmap 18 is empty, LUN A' on the secondary storage system 12 is a full copy of LUN A on the primary storage system 14.

In some embodiments, during resynchronization new writes on the primary storage system are either added to bitmap 18 or are submitted synchronously to the secondary storage system 14 and removed from bitmap 18. As per normal remote copy operations of the storage system 10, this may require the remote write to be extended to cover an entire grain by reading the rest of the grain on the primary storage system 12 if the write is shorter than a grain. If subset chunks of the second bitmap are sent to the primary storage system 12 as they are available, it may be that the process of catching up with the resynchronization is active before the process of the secondary storage system 14 determining the whole of the second bitmap is completed. The secondary storage system 14 will only become point in time consistent with the primary storage system 12 after all of the second bitmap is determined, sent to the primary storage system 12, and has its indicated grains' data copied back to the secondary storage system 14. These operations may be sequential for any particular address, but non-overlapping address ranges can proceed in parallel.

Figure 3:
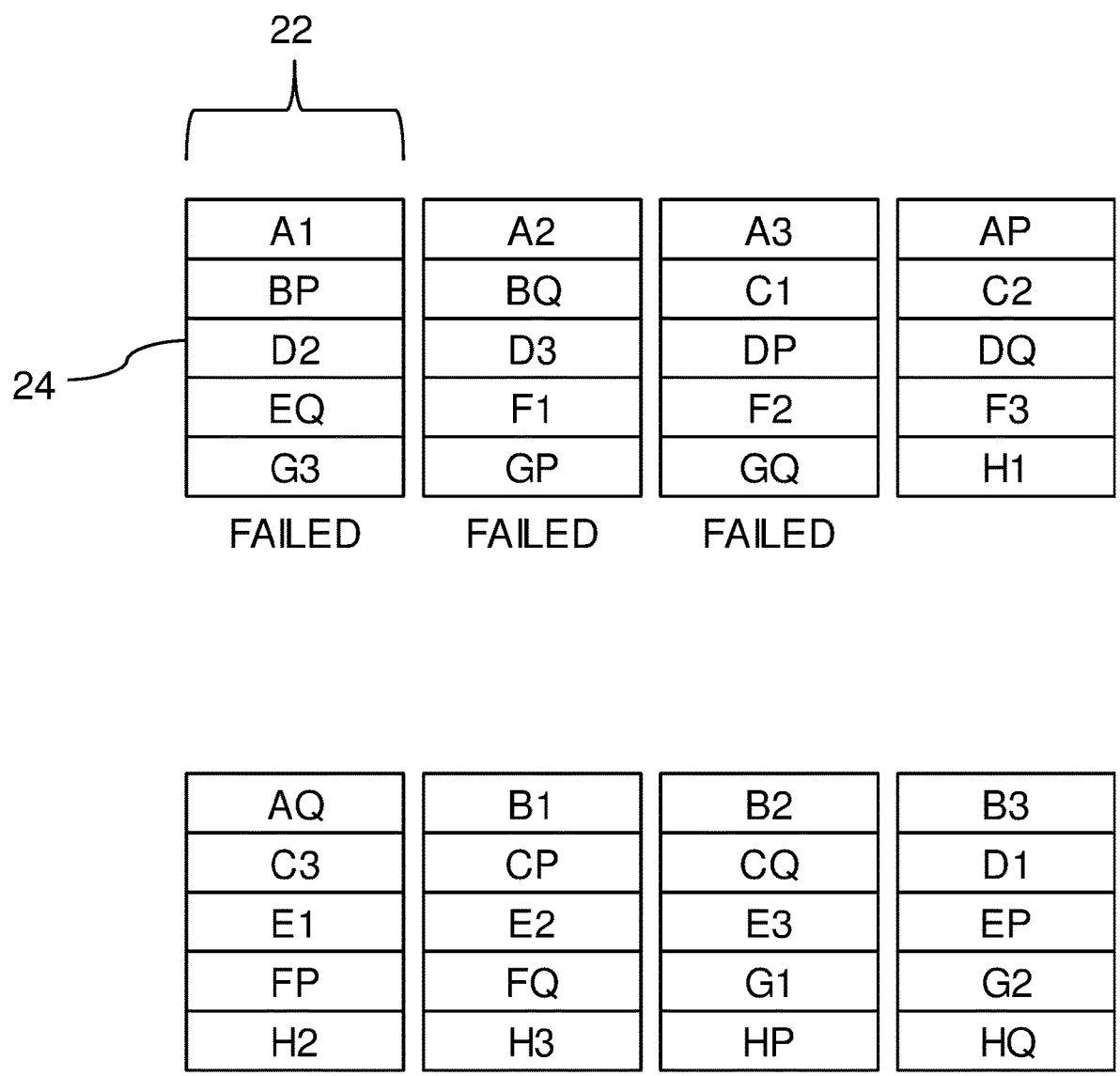
FIG. 3 illustrates a schematic diagram of a different set of drives of a storage system, in accordance with embodiments of the present disclosure.

FIG. 3 illustrates a specific example of the system 10 in operation, with respect to a failure at the secondary storage system 14. In this example, there are eight drives 22 present at the secondary storage system 14 and each drive 22 has five stripes 24. There are eight different data sets A to H being stored by the secondary storage system 14 (which is simply replicating the exact same topology and data as at the primary storage system 12). The eight different data sets are represented by the reference signs of A1, A2, A3, AP, AQ, B1, B2 etc., where n1 to n3 are the stored data and nP and nQ are the parity stripes 24. As stated above, with respect to this Figure, the two parity stripes 24 for each data set means that two failures can be repaired with RAID, but not three.

In this example it is assumed that the first three drives 22 have failed, this results in data loss for the A, D and G data strides (since these data sets have three stripes each in the first three drives 22). Additionally, stripes C1, F1 and F2 must be rebuilt and the parity stripes BP, BQ and EQ must be recalculated. The rebuilding and recalculating of these stripes can all be done locally without data from the primary storage system 12, but the lost data can only be recreated by data being transferred from the primary storage system 12. At this point, the connection between the two storage systems 12 and 14 is lost, since new physical drives need to be installed at the secondary storage system 14 before the repair can begin.

Figure 4A:
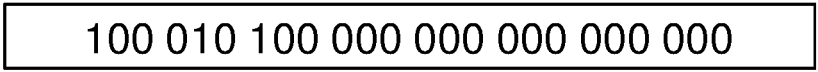
FIGS. 4A and 4B illustrate schematic diagrams of bitmaps, in accordance with embodiments of the present disclosure.
Figure 4B:
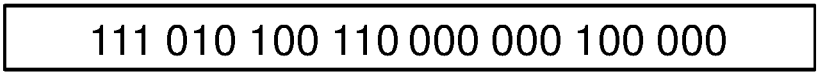

In this example, it is now assumed that three writes are received at the primary storage system 12 while the two storage systems 12 and 14 are out of synchronization. The three writes map to A1, B2 and C1. The resulting bitmap 18 is shown in FIG. 4a, which is ordered sequentially, A1, A2, A3, B1, B2, B3, C1 etc. This bitmap 18 can now be updated with the necessary (additional) data needed by the secondary storage system 14 to completely recover all of the lost data from the three drive failures and therefore restore the secondary storage system to be a true copy of the primary storage system 12. The updated bitmap 18 is shown in FIG. 4b. In addition to the three writes required by the updates to the primary storage system 12 (shown in FIG. 4a) there are an extra five writes are required to repair the entire secondary storage system 14. This compares to twenty-four writes, if the entire data set has to be resynced.

The final bitmap 18 shown in FIG. 4b is arrived at as follows. After the failure of drives one to three (shown in FIG. 3), the secondary storage system 14 requires data for the A, D and G data strides, additionally stripes C1, F1 and F2 must be rebuilt and the parity stripes BP, BQ and EQ must be recalculated. C1 needs to be resynced due to the additional write to the primary storage system 12 anyway so the rebuild can be skipped. BP and BQ can be recalculated after B2 has been resynced. A2 and A3 have to be added to the bitmap 18 (A1 is already present in the bitmap 18) to repair the A stride. D1 and D2 must be added to the bitmap 18 to repair the D stride, which allows the DP parity to be recalculated. Finally G3 must be added to the bitmap 18 so that the G stride can be repaired, again the GP and GQ parities to be recalculated.

Figure 5:
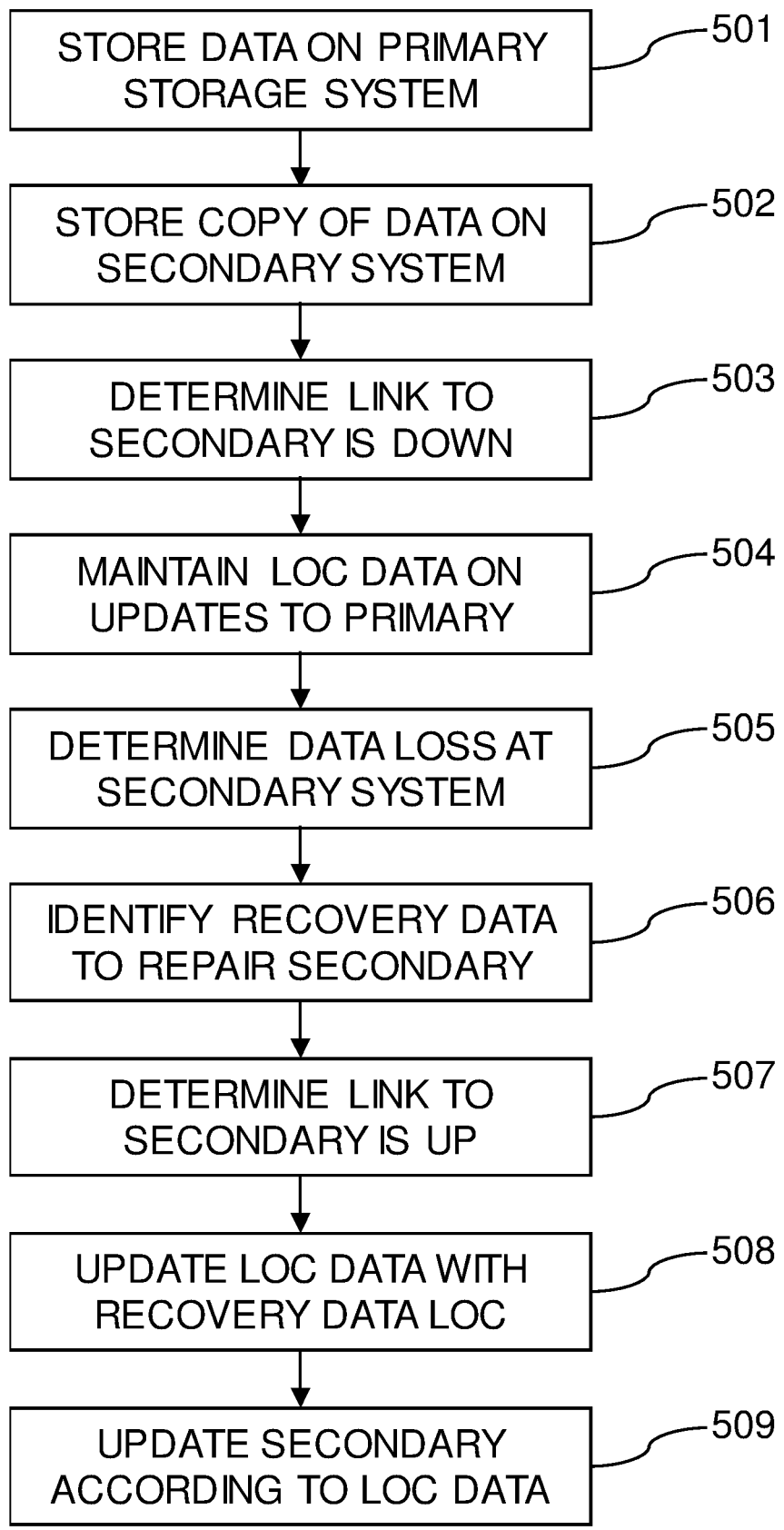
FIG. 5 illustrates a flowchart of a method of operating a data storage system, in accordance with embodiments of the present disclosure.

FIG. 5 summarizes a method of operating the data storage system 10, which comprises a primary storage system 12 and a secondary storage system 14 connected to the primary storage system 12. The method comprises a first step 501, which includes storing a set of data on the primary storage system 12. At step 502, a copy of the set of data is stored on the secondary storage system 14. The next step in the method is step 503, which comprises determining that a connection to the secondary storage system 14 is currently unavailable. The connection may be unavailable through a technical issue with the connection or because the secondary storage system 14 is currently offline (e.g., for physical repairs), for example.

The next step 504 includes maintaining location data (preferably in the form of a bitmap 18) identifying where changes have been made to the primary storage system 12 while the connection to the secondary storage system 14 is unavailable. Meanwhile, the next step is step 505, which includes determining that data has been lost at the secondary storage system 14. This is followed by step 506, wherein recovery data required to repair the data that has been lost at the secondary storage system 14 is identified. In a RAID system, not all of the lost data will be needed to repair all of the missing data. This is because parity data stored in a RAID system leads to data redundancy, and, therefore, the recovery data required to repair the secondary storage system 14 is likely to be less than the totality of the lost data.

The next step in the process is step 507, which comprises determining that the connection to the secondary storage system 14 is now available. The process then continues with step 508, wherein the location data (the bitmap 18) is updated with the location(s) of the recovery data required to repair the data that has been lost at the secondary storage system 14. Next, at step 509, the secondary storage system 14 is updated with data from the primary storage system 12 as defined by the location data 18. In this way the bitmap 18, which contains details of updates that need to be passed from the primary storage system 12 to the secondary storage system 14 can also be used to restore data that has been lost at the secondary storage system 14. The two functions of the bitmap 18 are combined into a single data structure (the bitmap 18 itself) and into a single process (the updating of the secondary storage system 14 with data from the primary storage system 12). In embodiments, steps 508 and 509 of the method can be performed asynchronously (consecutively) or synchronously. In the latter case, the primary storage system 12 may send data needed according to the bitmap 18 while the bitmap 18 is still being updated by the secondary storage system 14.

In a particular embodiment, the copy of the set of data stored on the secondary storage system 14 is stored in a distributed RAID array and the step 506 of identifying recovery data required to repair the data that has been lost at the secondary storage system 14 includes defining the recovery data as the minimum amount of data required to reconstruct the distributed RAID array. Since RAID systems include data redundancy, when data is lost, not all of the data needs to be recovered in order to repair the lost data. The recovery data may be defined as the minimum amount of data needed to repair the data that has been lost at the secondary storage system 14.

Either or both of the primary storage system 12 and the secondary storage system 14 could be provided with a storage controller. A storage controller manages the reading and writing of data to the drives that form part of the respective storage system 12 and 14 and also communicates with external hardware via network connections, such as over the connection 20. The storage controller could be a single hardware component or could be a distributed set of components that together perform the functions of the storage controller. In one embodiment, the data storage system 10 comprises the primary storage system 12, the secondary storage system 14, and two storage controllers that form part of the respective storage systems 12 and 14.

Figure 6:
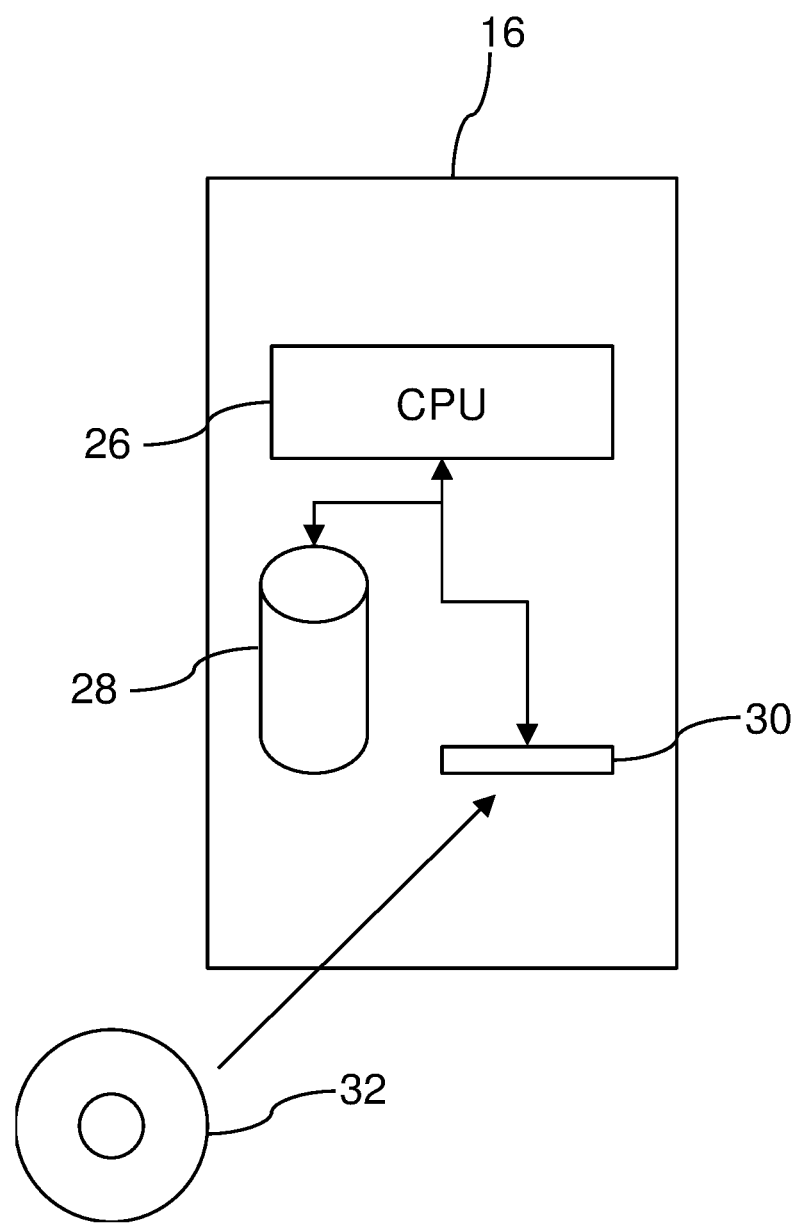
FIG. 6 illustrates a schematic diagram of storage controller, in accordance with embodiments of the present disclosure.

FIG. 6 shows more detail of one embodiment of a storage controller 16. In some embodiments, components of the storage controller (e.g., processor and memory) may be incorporated into the primary and second storage systems 12 and 14. In the depicted example, the storage controller 16 comprises a processor 26 that controls the operation of the primary or secondary storage system 12 or 14 (or both). The processor 26 of the storage controller 16 is also connected to a local storage device 28 (which could store the bitmap 18) and to a local interface 30. A computer readable storage medium 32 is provided, which is a CD-ROM 32 storing a computer program product that can be used to control the processor 26 to operate the storage controller 16. The processor 26 executes instructions from the computer program product to operate the storage controller 16.

If a single storage controller 16 is used, then the storage controller 16 may be connected to the primary storage system 12 and the secondary storage system 14. In FIG. 6, the storage controller 16 is shown as single component, but in a second embodiment of the storage controller 16, multiple physical boxes of the same form as that shown in FIG. 6 may be used to make up the storage controller 16, with the location of each node being such that they may or may not be local and are therefore connected together via fibre channel, Ethernet, IP (iSCSI), FCOE or some other connection technology.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method of operating a data storage system comprising a primary storage system and a secondary storage system connected to the primary storage system, the method comprising:
    storing a set of data on the primary storage system;
    storing a copy of the set of data on the secondary storage system;
    determining that a connection from the primary storage system to the secondary storage system is currently unavailable;
    maintaining location data identifying where changes have been made to the primary storage system while the connection to the secondary storage system is unavailable, the location data maintained in a first bitmap for the primary storage system, wherein each bit of the first bitmap corresponds to a data location within the primary storage system;
    determining that data has been lost at the secondary storage system;
    identifying recovery data required to repair the data that has been lost at the secondary storage system;
    in response to identifying recovery data, generating a second bitmap for the secondary storage system, wherein the recovery data is identified in the second bitmap for the secondary storage system;
    determining that the connection to the secondary storage system is now available;
    updating the location data of the first bitmap with locations of the recovery data of the second bitmap required to repair the data that has been lost at the secondary storage system, wherein the second bitmap is logically joined into the first bitmap to update the location data of the first bitmap; and
    updating the secondary storage system with data from the primary storage system as defined by the location data of the updated first bitmap.

2. A method according to claim 1, wherein the storing of a copy of the set of data on the secondary storage system comprises storing the copy of the set of data in a distributed RAID array, and wherein the identifying of recovery data required to repair the data that has been lost at the secondary storage system comprises defining the recovery data as the minimum amount of data required to reconstruct the distributed RAID array.

3. A method according to claim 1, wherein the maintaining of location data identifying where changes have been made to the primary storage system while the connection to the secondary storage system is unavailable comprises maintaining a set of data addresses defining data locations within the primary storage system.

4. A method according to claim 1, wherein the updating of the location data with the locations of the recovery data required to repair the data that has been lost at the secondary storage system and the updating of the secondary storage system with data from the primary storage system as defined by the location data are performed synchronously.

5. A data storage system comprising a primary storage system and a secondary storage system connected to the primary storage system, the data storage system arranged to:
    store a set of data on the primary storage system;
    store a copy of the set of data on the secondary storage system;
    determine that a connection from the primary storage system to the secondary storage system is currently unavailable;
    maintain location data identifying where changes have been made to the primary storage system while the connection to the secondary storage system is unavailable, the location data maintained in a first bitmap for the primary storage system, wherein each bit of the first bitmap corresponds to a data location within the primary storage system;
    determine that data has been lost at the secondary storage system;
    identify recovery data required to repair the data that has been lost at the secondary storage system;
    in response to the recovery data being identified, generate a second bitmap for the secondary storage system, wherein the recovery data is identified in the second bitmap for the secondary storage system;
    determine that the connection to the secondary storage system is now available;
    update the location data of the first bitmap with locations of the recovery data of the second bitmap required to repair the data that has been lost at the secondary storage system, wherein the second bitmap is logically joined into the first bitmap to update the location data of the first bitmap; and update the secondary storage system with data from the primary storage system as defined by the location data of the updated first bitmap.

6. A system according to claim 5, wherein the data storage system is arranged, when storing a copy of the set of data on the secondary storage system, to store the copy of the set of data in a distributed RAID array, and wherein the data storage system is further arranged, when identifying recovery data required to repair the data that has been lost at the secondary storage system, to define the recovery data as the minimum amount of data required to reconstruct the distributed RAID array.

7. A system according to claim 5, wherein the data storage system is arranged, when maintaining location data identifying where changes have been made to the primary storage system while the connection to the secondary storage system is unavailable, to maintain a set of data addresses defining data locations within the primary storage system.

8. A system according to claim 5, wherein the data storage system is arranged to perform the updating the location data with the locations of the recovery data required to repair the data that has been lost at the secondary storage system and the updating of the secondary storage system with data from the primary storage system as defined by the location data synchronously.

9. A computer program product for controlling a data storage system comprising a primary storage system and a secondary storage system connected to the primary storage system, the computer program product comprising a computer readable storage medium having program instructions embodied therewith, the program instructions executable by a processor to cause the processor to perform a method comprising:

storing a set of data on the primary storage system;

storing a copy of the set of data on the secondary storage system;

determining that a connection from the primary storage system to the secondary storage system is currently unavailable;

maintaining location data identifying where changes have been made to the primary storage system while the connection to the secondary storage system is unavailable, the location data maintained in a first bitmap for the primary storage system, wherein each bit of the first bitmap corresponds to a data location within the primary storage system;

determining that data has been lost at the secondary storage system;

identifying recovery data required to repair the data that has been lost at the secondary storage system;

in response to identifying recovery data, generating a second bitmap for the secondary storage system, wherein the recovery data is identified in the second bitmap for the secondary storage system;

determining that the connection to the secondary storage system is now available;

updating the location data of the first bitmap with locations of the recovery data of the second bitmap required to repair the data that has been lost at the secondary storage system, wherein the second bitmap is logically joined into the first bitmap to update the location data of the first bitmap; and updating the secondary storage system with data from the primary storage system as defined by the location data of the updated first bitmap.

10. A computer program product according to claim 9, wherein the copy of the set of data is stored on the secondary storage system in a distributed RAID array, and wherein the recovery data is the minimum amount of data required to reconstruct the distributed RAID array and less than all of the portion that has been lost.

11. A computer program product according to claim 9, wherein the location data is maintained in the first bitmap, wherein each bit of the first bitmap corresponds to a data location within the primary storage system, wherein the locations of the recovery data are maintained in the second bitmap, and wherein the updating the location data comprises:

combining the location data with the locations of the recovery data by ORing together the bits of the first bitmap and the second bitmap to create a combined bitmap that represents the updated location data.

12. A computer program product according to claim 9, wherein the location data is maintained as a set of data addresses defining data locations within the primary storage system.

13. A computer program product according to claim 9, wherein the updating the location data with the locations of the recovery data and the updating the secondary storage system with data from the primary storage system as defined by the updated location data are performed synchronously.

* * * * *